Patented July 17, 1951

2,560,824

UNITED STATES PATENT OFFICE 2,560,824

METHOD OF PREPARING A TRIARYL CYANURATE

Frederic C. Schaefer, Stamford, Conn., assignor to American Cyanamid Company, New York, N. Y., a corporation of Maine No Drawing. Application March 4, 1948, Serial No. 13,075

11 Claims. (Cl. 260—248)

This invention relates to a method of preparing a triaryl cyanurate, and more particularly is concerned with such a method which comprises heating together ingredients consisting of (1) cyanuric chloride and (2) a phenol (monohydroxybenzene) selected from the class consisting of phenol itself (i. e., the compound having the formula $C_6H_5OH$), alkyl-substituted phenols (e. g., o-, m-, and p-cresols, the various xylenols, the various ethyl-, propyl-, and butyl-substituted phenols, etc.) and halogeno-substituted phenols, more particularly the mono-, di-, tri-, tetra-, and penta-halogeno (-chloro, -bromo, -fluoro, and -iodo) -substituted phenols. From the foregoing it will be seen that the phenol of (2) can be represented generically by the formula $C_6R_5OH$ wherein each R represents any member of the class consisting of hydrogen, halogen and alkyl. The cyanuric chloride and the phenol are employed in a molar ratio of one mole of the former to not less than 3 moles, e. g., from 3, 3.1 or 3.2 to 10, 15 or more moles of the latter. The reaction between the cyanuric chloride and the phenol is effected by heating, specifically fusing, these reactants together in the absence of an added solvent, hydrohalide acceptor or other reactant. Heating is continued at a temperature within the range of 170° C. (about 170° C.) to 250° C. (about 250° C.), usually not higher than 225° C. (about 225° C.) and preferably within the range of 170° C. to 210° C. (about 210° C.) e. g., at about 180° or 185° C. to about 200° or 205° C., until no more hydrogen chloride is evolved, that is to say, until all or substantially all of the hydrogen chloride which is formed as a by-product of the reaction has been eliminated. Thereafter a triaryl cyanurate corresponding to the phenol employed is isolated from the resulting reaction mass, e. g., by washing out the impurities including any unreacted starting materials, leaving a residue of purified triaryl cyanurate.

Triaryl cyanurates were prepared prior to my invention by (a) reaction of sodium phenoxide in phenol with cyanuric chloride [Ber. 19, 2061 (1886)] or with cyanogen chloride [Ber. 18, 764 (1885)]; (b) by reaction of chlorodiaminotriazine with sodium phenoxide in phenol [Ber. 20, 2236 (1887)]; or (c) from diphenyl iminocarbonate [Ber. 28, 2472 (1895)].

It was also suggested (see Patent No. 1,994,602— Wieners) prior to my invention that vat dyestuffs of the anthraquinone series be prepared by effecting reaction between an aminoanthraquinone compound and a chlorinated 1,3,5-triazine represented by the formula

I

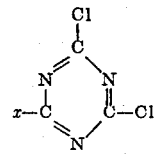

wherein $x$ represents chlorine, or an alkyl, aromatic, hydroaromatic or aliphatic-aromatic hydrocarbon radical of the benzene series, the reaction being effected in the presence of a phenol or a naphthol which is inert to the starting materials under the conditions of the reaction.

Graham stated in his Patent No. 2,373,826 that he had found that when unsubstituted cyanuric chloride is reacted with an amine of the anthraquinone series, even at 100° C. to 120° C., in phenol or similar solvents as more particularly disclosed in Patent No. 1,994,602, replacement of the first chlorine involves a reaction with the phenol itself as well as with the anthraquinone amine. The process of Graham is an improvement upon Wieners' process of preparing dyes of the anthraquinone series. Specifically, Graham found that dyes of increased purity and brightness of shade and which exhibit good properties of fastness can be produced in high yields when at least one, and preferably two, of the chlorine atoms of the cyanuric chloride are first replaced with an aromatic amine or an amine of the anthraquinone series by effecting reaction between the said chloride and amine in an inert organic solvent such as nitrobenzene, chlorobenzenes, naphthalene, etc., after which the third chlorine atom is replaced by effecting reaction between the reaction product initially formed and an aromatic or anthraquinone amine in a solvent which is either a phenol or a naphthol and at a temperature of from 100° C. to 120° C.

Fritzsche et al. (Patent No. 1,551,095) found that cyanuric chloride can be condensed with α-naphthol at 140°–160° C., in the absence of a catalyst, to give tris(4-hydroxy-1-naphthyl)-s-triazine or at lower temperatures (−5° C. to +15° C.) to give di-substitution products.

From the prior art teachings, and especially from the teachings of Wieners, Graham and Fritzsche et al., it is seen that the method of preparing triaryl cyanurates with which the present invention is concerned was wholly unobvious and unpredictable. Thus, from the teachings of Fritzsche et al. it ordinarily would be expected that phenol and the alkyl- and halogeno-substituted phenols would react with cyanuric chloride in the same manner as α-naphthol, and that the reaction products would be tris(hydroxyphenyl)-s-triazines instead of the triaryl cyanurates which I surprisingly found to be produced.

It is a primary object of the present invention to provide an economical and efficient method of producing a triaryl cyanurate which may be represented by the general formula

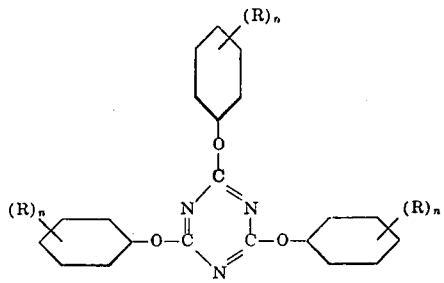

II wherein R represents a member of the class consisting of hydrogen, halogen, and alkyl, and $n$ represents an integer between 1 and 5, inclusive.

It is a further object of the present invention to provide an improved method of preparing a triaryl cyanurate of the kind embraced by Formula I in a high yield.

These and other objects are attained as described briefly in the first paragraph of this specification and more fully hereafter.

In carrying my invention into effect cyanuric chloride and phenol or an alkyl- or halogeno-substituted phenol are heated together as stated in the first paragraph hereof. Mixtures of such phenols may be used, thereby to obtain a mixture of triaryl cyanurates. The phenols employed are free from substituents which are reactive with the cyanuric chloride reactant or with the hydrogen chloride by-product of the reaction. Good results have been obtained by heating the mixed reactants at 185° C. (about 185° C.) to 210° C. (about 210° C.), in the absence of any added solvent, hydrohalide acceptor or other reactant or diluent. Higher temperatures of the order of 220° or 225° C. or even as high as 240° or 250° C. may be used if desired, but no particular advantages ordinarily accrue by heating much above about 210° C.

The reactants are employed in a molar ratio of at least 3 moles of the phenol for each mole of the cyanuric chloride. I prefer to use an excess of the phenol over the stoichiometrical amount required for reaction with the cyanuric chloride to produce the triaryl cyanurate. Thus, I may employ only a relatively small excess of the phenol over stoichiometrical proportions, e. g., from 3.1 to 3.5 or 4 moles of the phenol per mole of cyanuric chloride; or, if desired, the phenol may be used in considerably larger proportions, e. g., from 5 to 10 or 15 or even as much as 20 or 30 or more moles of the phenol for each mole of the cyanuric chloride. One advantage of the use of the larger amounts of phenol is that it provides somewhat better control of the reaction conditions and facilitates the subsequent handling of the reaction mass and the purification of the triaryl cyanurate.

The reaction preferably is effected in a reaction vessel provided with a reflux air condenser or other suitable condenser.

The time of reaction may be varied as desired or as conditions may require, e. g., from 2 or 3 to 8 or 10 or more hours, but in all cases it is continued until all or substantially all of the hydrogen chloride by-product of the reaction has been evolved, thereby to assure that a maximum yield of the triaryl cyanurate has been obtained.

The triaryl cyanurate resulting from the reaction between the phenol and cyanuric chloride is isolated from the reaction mass by any suitable means, e. g., the crude cyanurate produced by the reaction may be purified by treating it with a solvent or solvents which will remove any unreacted phenol or cyanuric chloride, or other contaminants, leaving a residue of purified triaryl cyanurate. Illustrative examples of solvents that may be used for this purpose are alcohols (e. g., methyl, ethyl, propyl, n-butyl, isobutyl and other aliphatic alcohols); aromatic hydrocarbons (e. g., benzene, toluene, xylene, etc.); ketones (e. g., acetone, etc.); or any other solvent or mixture of solvents or other treating agent which will remove the impurities from the crude triaryl cyanurate.

In order that those skilled in the art better may understand how the present invention may be carried into effect, the following examples are given by way of illustration and not by way of limitation. All parts and precentages are by weight.

*Example 1*

|  | Parts | Approx. Molar Ratio |
|---|---|---|
| Cyanuric chloride | 10 | 1.0 |
| Phenol | 25 | 4.9 | were heated together for 5 hours at 170°–175° C. in an open reaction vessel. Hydrochloric acid was evolved vigorously at first. After 5 hours' heating no more hydrogen chloride was being evolved, and the mass was almost completely solid at 175° C. The reaction mass was washed first with aqueous sodium hydroxide solution and then with water, yielding 21 parts of triphenyl cyanurate (100% yield) with a melting point of 232°–234° C. Upon recrystallization from benzene, silky needles of triphenyl cyanurate, M. P. 233.5°–234° C. were obtained. The recrystallized material gave a mixed melting point of 234°–235° C. with a known sample of triphenyl cyanurate having a melting point of 235°–236° C.

*Example 2*

|  | Parts | Approx. Molar Ratio |
|---|---|---|
| Cyanuric chloride | 92.5 | 1 |
| Phenol | 188.0 | 4 | were heated together for 5 hours at 175°–190° C. in a reaction vessel provided with a reflux air condenser. After heating for 3 hours almost all of the hydrogen chloride by-product of the reaction had been evolved and the reaction mass was nearly completely solidified. At this point the reaction mass was only slightly discolored. Heating was continued for an additional 2 hours to be sure that reaction was complete. After cooling to room temperature the solid reaction product was crushed and extracted with about 400 parts of boiling methanol to yield, after drying the white residue, 160 parts (90% yield) of triphenyl cyanurate, M. P. 234°–236° C.

*Example 3*

|  | Parts | Approx. Molar Ratio |
|---|---|---|
| Cyanuric chloride | 700 | 1 |
| Phenol | 1,430 | 4 | were placed in a suitable reaction vessel provided with a reflux air condenser, and thereafter heated by placing the vessel in an oil bath maintained at a temperature of 200°–225° C. Heating was continued for 6 hours. Hydrogen chloride was evolved vigorously during the first few hours. At the end of the reaction period no more hydrogen chloride was being evolved.

Most of the molten mass was cautiously poured (that is, as much of the mass as could be poured) into about 2400 parts of methanol. The material precipitated by the methanol was finely divided and could be filtered readily. By this procedure most of the excess phenol was removed from the major portion of the reaction mass. The portion of the reaction product which solidified in the reaction vessel was mixed with the methanol filtrate and boiled for 30 minutes to disintegrate most of the lumps. The finely divided portion was slurried and separated by filtration. The larger lumps were filtered separately, dried at 105° C. and powdered. The pulverized material was thoroughly extracted with fresh, boiling methanol and then filtered through the same funnel used in separating the other solid portions from the methanol. In this way the partly purified triphenyl cyanurate was accumulated in a finely divided condition on the funnel. This product was extracted with cold ethanol until the washings (initially black) were straw-colored. The material was then washed well with water, followed with a 2% aqueous solution of hydrochloric acid until the washings had no iron color, next with water, then with a 1% aqueous solution of sodium hydroxide, and finally with water. The washed triphenyl cyanurate was dried for about 16 hours at 120°–125° C., yielding 1045 parts (77.5% of the theoretical) of triphenyl cyanurate, M. P. 230°–232° C. A purer product can be obtained by recrystallization from large volumes of benzene, dioxane or ethylene glycol monomethyl ether.

*Example 4*

|  | Parts | Approx. Molar Ratio |
|---|---|---|
| Cyanuric chloride | 18.4 | 1.0 |
| p-tert.-Octylphenol | 63.9 | 3.1 | were heated together for 4 hours at 175°–185° C. in a reaction vessel provided with an air condenser. Hydrogen chloride gas was evolved gently. After heating for 2 hours a considerable amount of solid was present in the reaction vessel. At the end of the reaction period no more hydrogen chloride was being evolved.

The reaction mass was allowed to stand for about 64 hours at room temperature, after which it was heated at 175° C. for an additional 30 minutes. It was then cooled and extracted with about 40 parts of boiling methanol, yielding 59 parts (85% of the theoretical) of tris(p-tert.-octylphenyl) cyanurate, M. P. 292° C. ±2° C. A portion of the product was recrystallized from hot benzene to obtain fine, white needles of tris-(p-tert.-octylphenyl) cyanurate, which melted at 293°–294° C. and showed the following upon analysis:

|  | Per Cent Carbon | Per Cent Hydrogen |
|---|---|---|
| Calculated for $C_{45}H_{63}N_3O_3$ | 77.88 | 9.15 |
| Found | 77.74 | 8.76 |
|  | 77.63 | 8.91 |

Another portion which had been recrystallized from hot dioxane, washed with methyl alcohol and dried at 105° C. had a melting point of 294°–295° C. No hydroxytriazines were found to be present.

*Example 5*

|  | Parts | Approx. Molar Ratio |
|---|---|---|
| Cyanuric chloride | 36.8 | 1.0 |
| 3,5-Xylenol | 76.8 | 3.15 | were heated together for 4 hours at 190°–210° C. in a reaction vessel provided with an air condenser. Hydrogen chloride gas was evolved gently. At the end of the reaction period no more hydrogen chloride was being evolved, and there was some solid present in the blackened reaction mass. Some material was still refluxing at 200° C. when further heating was discontinued.

To the reaction mass was added about 160 parts of ethyl alcohol, and the whole was boiled for a short period. The resulting mass was filtered, and the solid which was collected on a funnel was washed with ethyl alcohol until the washings were only slightly colored. This left buff-colored needles of crude tris(3,5-xylyl) cyanurate which, after drying at 105° C., amounted to 70 parts (80% of the theoretical). The melting point of the crude product was 265°–270° C. This material was recrystallized from a large volume of hot toluene, yielding small, granular crystals of purified tris(3,5-xylyl) cyanurate, melting at 268.5°–269.5° C, and showing the following upon analysis:

Per cent nitrogen
Calculated for $C_{27}H_{27}N_3O_3$ _____ 9.52
Found _____ 9.40

*Example 6*

|  | Parts | Approx. Molar Ratio |
|---|---|---|
| Cyanuric chloride | 59.0 | 1.0 |
| p-Chlorophenol | 128.5 | 3.1 | were heated together, with stirring, for 6 hours at 190° C. in a reaction vessel equipped with a stirrer, thermometer and air reflux condenser, during which time hydrogen chloride gas was gradually given off. At the end of the reaction period no more hydrogen chloride was being evolved. The brownish reaction mass, which solidified on cooling to room temperature, was ground to a fine powder and then washed three times with ethanol using about 160 parts for each washing. Most of the brownish color was leached out by the ethanol. The resulting product was washed twice with 5% aqueous sodium hydroxide solution, using about 100 parts each time, and finally with water until substantially all of the alkali had been washed out. After filtering off the nearly colorless solid comprising tris(p-chlorophenyl) cyanurate, it was dried for 4 hours at 70° C. and then for 3 hours at 100° C. The yield of tris(p-chlorophenyl) cyanurate amounted to 124 parts (85% of the theoretical). A portion of this product was dissolved in a large volume of ethylene glycol monomethyl ether, treated with a decolorizing carbon, brought to a boil and filtered hot. The filtrate was allowed to cool slowly. The colorless precipitate which formed was filtered off, washed twice with ethyl alcohol, and then dried for 2 hours at 100° C. The colorless, microcrystalline tris(p-chlorophenyl) cyanurate thereby obtained showed the following upon analysis:

|  | Per Cent Chlorine | Per Cent Nitrogen |
|---|---|---|
| Calculated for $C_{21}H_{12}N_3O_3Cl_3$ | 23.1 | 9.12 |
| Found | 23.39 | 9.13 |
|  | 23.64 | 9.20 |
|  | 23.49 |  |

It will be understood, of course, by those skilled in the art that my invention is not limited to the use of the particular alkyl-substituted phenols employed in Examples 4 and 5 or the particular halogeno-substituted phenol used in Example 6. Instead of these substituted phenols any other mono-, di-, tri-, tetra-, or penta-alkyl (e. g., -methyl, -ethyl, -propyl, -isopropyl, -n-butyl, -isobutyl, -sec.-butyl, -tert.-butyl, -amyl, -isoamyl, -hexyl, -heptyl, -octyl, to octadecyl, inclusive, etc.) phenol or any other mono-, di-, tri-, tetra-, or penta-chloro, -bromo, -fluoro or -iodophenyl may be employed to produce the corresponding triaryl cyanurate as hereinbefore described. Phenols containing both alkyl and halogeno substituents may be used. Illustrative examples of phenols that may be employed are:

| | |
|---|---|
| o-, m- and p-Cresols | 2,4-dioctylphenol |
| 2,3-xylenol | o-,m- and p-Chlorophenols |
| 2,4-xylenol | o-, m- and p-Bromophenols |
| 2,5-xylenol | o-, m- and p-Fluorophenols |
| 2,6-xylenol | 2,3-dichlorophenol |
| 3,4-xylenol | 2,4-dichlorophenol |
| 2,3-diethylphenol | 2,5-dichlorophenol |
| 2,4-diethylphenol | 2,6-dichlorophenol |
| 2,5-diethylphenol | 3,4-dichlorophenol |
| 2,6-diethylphenol | 3,5-dichlorophenol |
| 3,4-diethylphenol | 2,4-dibromophenol |
| 3,5-diethylphenol | 2,6-dibromophenol |
| 2,3,5-trimethylphenol | 2,4-diiodophenol |
| 2,4,6-trimethylphenol | 2,6-difluorophenol |
| 2,3,4,6-tetramethylphenol | 2,3,5-trichlorophenol |
| Pentamethylphenol | 2,4,6-trichlorophenol |
| o-, m- and p-Ethylphenols | 2,4,6-tribromophenol |
| o-, m- and p-Propylphenols | 2,3,4,6-tetrachlorophenol |
| o-, m- and Butylphenols | Pentachlorophenol |
| p-Amylphenol | Pentabromophenol |
| p-Octadecylphenol | 2-methyl-4-chlorophenol |
| 2,3-dipropylphenol | 2-methyl-6-bromophenol |

I claim:

1. The method of preparing a triaryl cyanurate which comprises heating together ingredients consisting of (1) cyanuric chloride and (2) a phenol corresponding to the general formula $C_6R_5OH$ wherein each R represents any member of the class consisting of hydrogen, halogen and alkyl, the ingredients of (1) and (2) being employed in a molar ratio of one mole of the former to not less than three moles of the latter, said heating being continued at a temperature within the range of 170° C. to 250° C. until no more hydrogen chloride is evolved, and isolating from the resulting reaction mass a triaryl cyanurate corresponding to the phenol employed.

2. A method as in claim 1 wherein the phenol of (2) is the compound having the formula $C_6H_5OH$.

3. A method as in claim 1 wherein the phenol of (2) is an alkyl-substituted monohydroxybenzene which otherwise is unsubstituted.

4. A method as in claim 1 wherein the phenol of (2) is a chloro-substituted monohydroxybenzene which otherwise is unsubstituted.

5. A method as in claim 1 wherein the ingredients of (1) and (2) are employed in a molar ratio of from 3.1 to 10 moles of the phenol of (2) for each mole of the cyanuric chloride of (1).

6. A method as in claim 1 wherein heating is continued at a temperature within the range of 170° C. to 210° C. until no more hydrogen chloride is evolved.

7. The method of preparing triphenyl cyanurate which consists in heating together ingredients consisting of cyanuric chloride and phenol in a molar ratio of 1 mole of the former to not less than 3 moles of the latter, said heating being continued at a temperature within the range of 170° to 225° C. until no more hydrogen chloride is evolved, and purifying the triphenyl cyanurate thereby produced.

8. The method of preparing triphenyl cyanurate which consists in heat-fusing together a mixture consisting of cyanuric chloride and phenol in a molar ratio of 1 mole of the former to from 4 to 10 moles of the latter, said fusing being continued at a temperature within the range of 170° to 210° C. until no more hydrogen chloride is evolved, and isolating and puriyfing the triphenyl cyanurate thereby produced.

9. In a method of preparing triphenyl cyanurate which comprises heat-fusing together a mixture consisting of cyanuric chloride and phenol in the ratio of 1 mole of the former to about 4-5 moles of the latter, said fusing being continued at a temperature within the range of 170° C. to 225° C. until no more hydrogen chloride is evolved and whereby a reaction mass containing impure triphenyl cyanurate is produced, the improvement which comprises washing said reaction mass first with aqueous sodium hydroxide and then with water whereby a purer form of triphenyl cyanurate is obtained.

10. In a method of preparing triphenyl cyanurate which comprises heat-fusing together a mixture consisting of cyanuric chloride and phenol in the ratio of 1 mole of the former to about 4-5 moles of the latter, said fusing being continued at a temperature within the range of 170° C. to 225° C. until no more hydrogen chloride is evolved and whereby a reaction mass containing impure triphenyl cyanurate is produced, the improvement which comprises extracting said reaction mass with methanol whereby a purer form of triphenyl cyanurate is obtained.

11. The method of preparing and purifying triphenyl cyanurate which comprises heat-fusing together a mixture consisting of cyanuric chloride and phenol for five hours at 170°–175° C., at the end of which period of time no more hydrogen chloride is being evolved and the reaction mass containing impure triphenyl cyanurate is almost completely solid at 175° C., washing the resulting reaction mass first with aqueous sodium hydroxide solution and then with water to obtain triphenyl cyanurate in purer form, and recrystallizing the resulting triphenyl cyanurate from benzene in order further to purify the same.

FREDERIC C. SCHAEFER.

REFERENCES CITED

The following references are of record in the file of this patent:

UNITED STATES PATENTS

| Number | Name | Date |
| --- | --- | --- |
| 1,994,602 | Wieners | Mar. 19, 1939 |
| 2,373,826 | Graham | Apr. 17, 1945 |

OTHER REFERENCES

Hoffman: Berichte de deut. Gesell. 19 (1886), page 2082.

Outline of Organic Chemistry, by Degering: Barnes and Noble, N. Y., 1937, p. 88.